(12) United States Patent
Williams et al.

(10) Patent No.: US 10,099,730 B1
(45) Date of Patent: Oct. 16, 2018

(54) DYNAMIC VEHICLE SPOILERS

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/602,267

(22) Filed: May 23, 2017

(51) Int. Cl.
*B62D 33/027* (2006.01)
*B62D 35/00* (2006.01)

(52) U.S. Cl.
CPC ....... *B62D 35/007* (2013.01); *B62D 33/0273* (2013.01)

(58) Field of Classification Search
CPC ... B62D 35/007; B62D 33/0273; B62D 33/03
USPC ...................................... 296/50, 57.1, 180.5
See application file for complete search history.

(56) References Cited

U.S. PATENT DOCUMENTS

| | | | | | |
|---|---|---|---|---|---|
| 4,863,213 | A | * | 9/1989 | Deaver | B62D 35/001 29/401.1 |
| 5,688,020 | A | * | 11/1997 | Burg | B62D 33/0273 296/180.1 |
| 6,364,392 | B1 | * | 4/2002 | Meinke | B60P 3/40 296/26.1 |
| 6,712,423 | B2 | | 3/2004 | Lehmann | |
| 6,729,680 | B2 | | 5/2004 | Lehmann | |
| 6,789,833 | B1 | * | 9/2004 | Alber | B60R 13/00 292/125 |
| 6,988,756 | B1 | * | 1/2006 | Meinke | B60P 3/40 296/26.08 |
| 7,182,395 | B2 | | 2/2007 | Lehmann | |
| 7,641,262 | B2 | * | 1/2010 | Nusbaum | B62D 35/001 296/180.5 |
| 7,641,275 | B2 | * | 1/2010 | Campbell | B60J 1/20 296/180.1 |
| 9,327,771 | B2 | | 5/2016 | Mantchev | |
| 2004/0256885 | A1 | | 12/2004 | Bui | |
| 2008/0018134 | A1 | * | 1/2008 | Schreiber | B60Q 1/0017 296/180.5 |
| 2008/0315623 | A1 | * | 12/2008 | Khalighi | B62D 33/0273 296/180.5 |
| 2009/0108611 | A1 | | 4/2009 | Bang | |

(Continued)

FOREIGN PATENT DOCUMENTS

WO    WO2010030158 A1    3/2010

*Primary Examiner* — Gregory A Blankenship
(74) *Attorney, Agent, or Firm* — Christopher G. Darrow; Darrow Mustafa PC

(57) ABSTRACT

Arrangements described herein include dynamic spoiler systems and methods for controlling such systems. The dynamic spoiler can include a housing operatively connected to a vehicle structure, such as a truck bed tailgate. The housing can have a lower panel, an upper panel, and an opening between the lower and upper panels. The dynamic spoiler can also include a fin moveable between a retracted position and one or more extended positions. In the retracted position, the fin can be substantially entirely located within a cavity defined by housing. In an extended position, the fin can extend at least partially out of the housing through the opening in a rearward direction.

19 Claims, 5 Drawing Sheets

(56) References Cited

U.S. PATENT DOCUMENTS

| | | | | |
|---|---|---|---|---|
| 2010/0032982 A1* | 2/2010 | Browne | ............... | B62D 35/00 |
| | | | | 296/180.5 |
| 2013/0076064 A1* | 3/2013 | Smith | ............... | B62D 35/001 |
| | | | | 296/180.1 |
| 2015/0232138 A1 | 8/2015 | Parry-Williams et al. | | |
| 2015/0274223 A1* | 10/2015 | Wolf | ............... | B62D 35/007 |
| | | | | 296/180.5 |
| 2016/0023693 A1* | 1/2016 | Wolf | ............... | B60L 11/1874 |
| | | | | 296/180.5 |
| 2016/0059911 A1* | 3/2016 | Shiga | ............... | B62D 35/007 |
| | | | | 296/180.5 |
| 2016/0159412 A1* | 6/2016 | Oxley | ............... | B62D 35/007 |
| | | | | 296/180.5 |
| 2016/0318560 A1* | 11/2016 | Kishima | ............ | B62D 35/007 |
| 2018/0001941 A1* | 1/2018 | Polidori | ............. | B62D 35/001 |
| 2018/0050742 A1* | 2/2018 | Smith | ............... | B62D 35/007 |

* cited by examiner

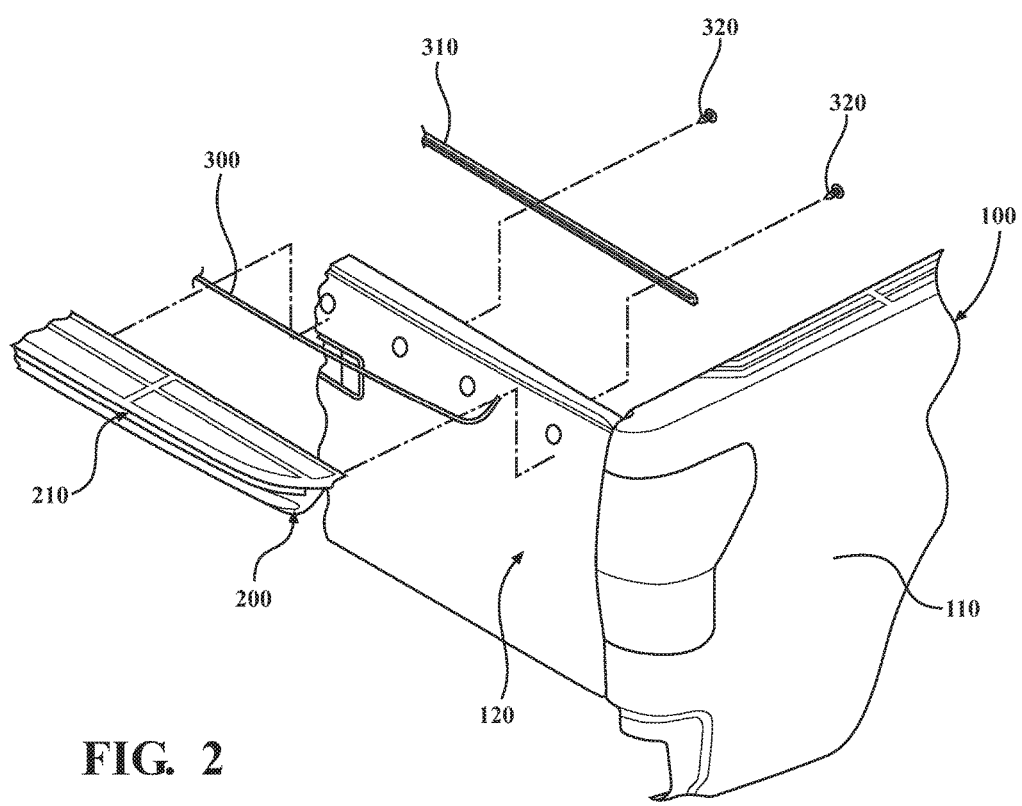
FIG. 2
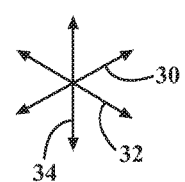

DYNAMIC VEHICLE SPOILERS

FIELD

The subject matter described herein relates in general to aerodynamic elements for vehicles and, more particularly, to dynamic vehicle spoilers.

BACKGROUND

Some vehicles, such as some trucks and utility vehicles, include open cargo areas. For example, the open cargo area can be a pickup truck bed. The open cargo area can have an impact on overall vehicle aerodynamics. For example, in some conditions, the open cargo area can cause air to follow non-laminar paths into and out of the open cargo area when a vehicle is moving. As shown in FIG. 1A, a vehicle 10 can include a bed 12 defined by two side panels 14, a front panel 16, and a tailgate 18. Movement of the vehicle 10 can cause an airflow 20 to enter the cargo area and encounter turbulent, or uneven, flow.

Some vehicles can include fixed aerodynamic elements to increase aerodynamic performance of the vehicle. For example, some vehicles can include fixed spoilers located near a top of the tailgate. As shown in FIG. 1B, a vehicle 10 can include a fixed spoiler 22 positioned near the top of the tailgate 18. The fixed spoiler 22 can allow an airflow 24 to have a more direct, or laminar, flow across the vehicle 10 during particular driving conditions. Fixed spoilers cannot be adjusted based on vehicle or environmental conditions.

SUMMARY

In one respect, the subject matter described herein relates to a method of controlling a dynamic spoiler of a vehicle. The dynamic spoiler includes a housing operatively connected to a vehicle structure. The dynamic spoiler also includes a fin. The fin is moveable relative to the housing between a retracted position and one or more extended positions. The fin is substantially entirely located within a cavity defined at least in part by the housing when the fin is in the retracted position. A distal end of the fin extends rearward of the housing in a longitudinal direction of the vehicle when the fin is in the one or more extended positions. The method includes detecting one of a vehicle condition or an environment condition. The method further includes determining a target position for the fin based on the detected vehicle condition or environment condition. The target position is the retracted position or one of the one or more extended positions. The method also includes causing the fin to be moved into or maintained in the target position.

In another respect, the subject matter described herein relates to a dynamic spoiler system for a vehicle. The system includes a housing configured for operative connection to a vehicle structure. The housing has a lower panel, an upper panel, a rearward-facing opening, and an internal cavity at least partially defined by the upper and lower panels. The system also includes a fin that is moveable between a retracted position and an extended position. When in the retracted position, the fin is substantially entirely located within the cavity defined by the housing. When in the extended position, the fin extends at least partially out of the housing through the opening in a rearward direction.

BRIEF DESCRIPTION OF THE DRAWINGS

FIG. 2 is an exploded view of a portion of an example vehicle having a dynamic spoiler.

DETAILED DESCRIPTION

Figure 1A:
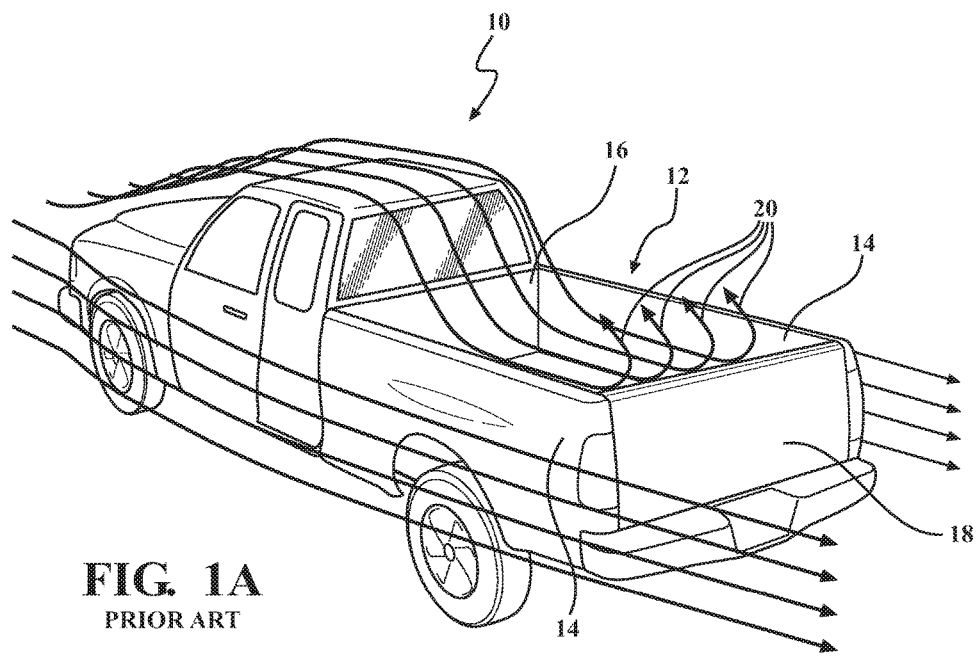
FIG. 1A shows an example airflow over a vehicle.
Figure 1B:
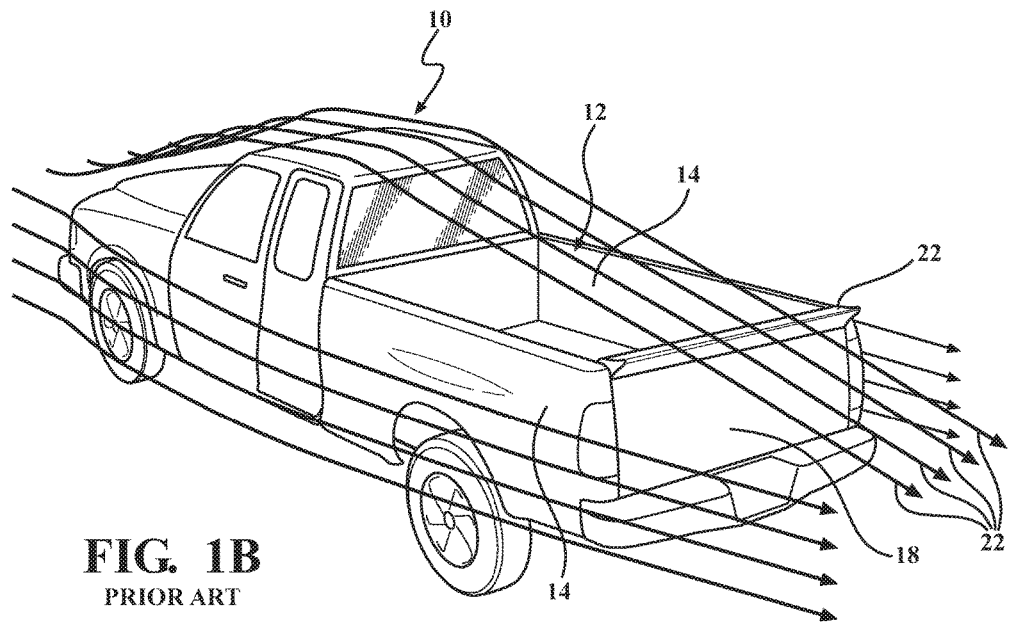
FIG. 1B shows an example airflow over a vehicle having a spoiler.

This detailed description relates to dynamic spoiler systems and methods for controlling such systems. Arrangements described herein can allow for changing spoiler characteristics to optimize aerodynamic properties. The dynamic spoiler can include a housing operatively connected to a vehicle structure, such as a truck bed tailgate. The housing can have a lower panel, an upper panel, and an opening between the lower and upper panels. The dynamic spoiler can also include a fin moveable between a retracted position and one or more extended positions. In the retracted position, the fin can be substantially entirely located within a cavity defined by housing. In an extended position, the fin can extend at least partially out of the housing through the opening in a rearward direction. In some cases, the fin can extend in a translational direction and/or be rotated in a rotational direction. The present detailed description relates to apparatuses, systems, and/or methods that incorporate one or more such features. In at least some instances, arrangements described herein can reduce airflow and turbulence over the vehicle, which can result in, for example, improved vehicle aerodynamics, increased gas mileage, improved noise, vibration, and harshness (NVH) characteristics, and/or improve overall vehicle efficiencies.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 3:
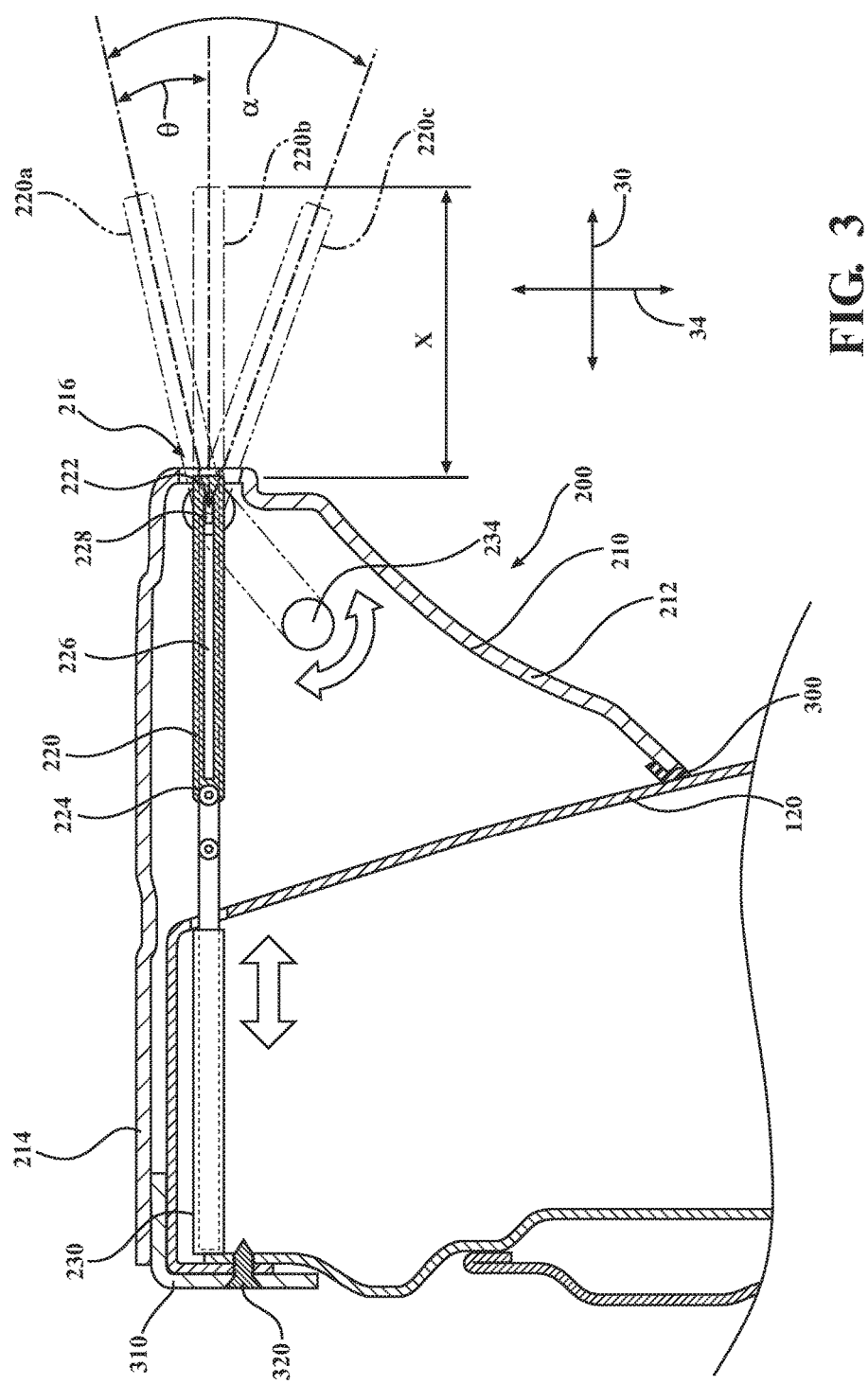
FIG. 3 is a partial cross-sectional view of the dynamic spoiler of FIG. 2.
Figure 4:
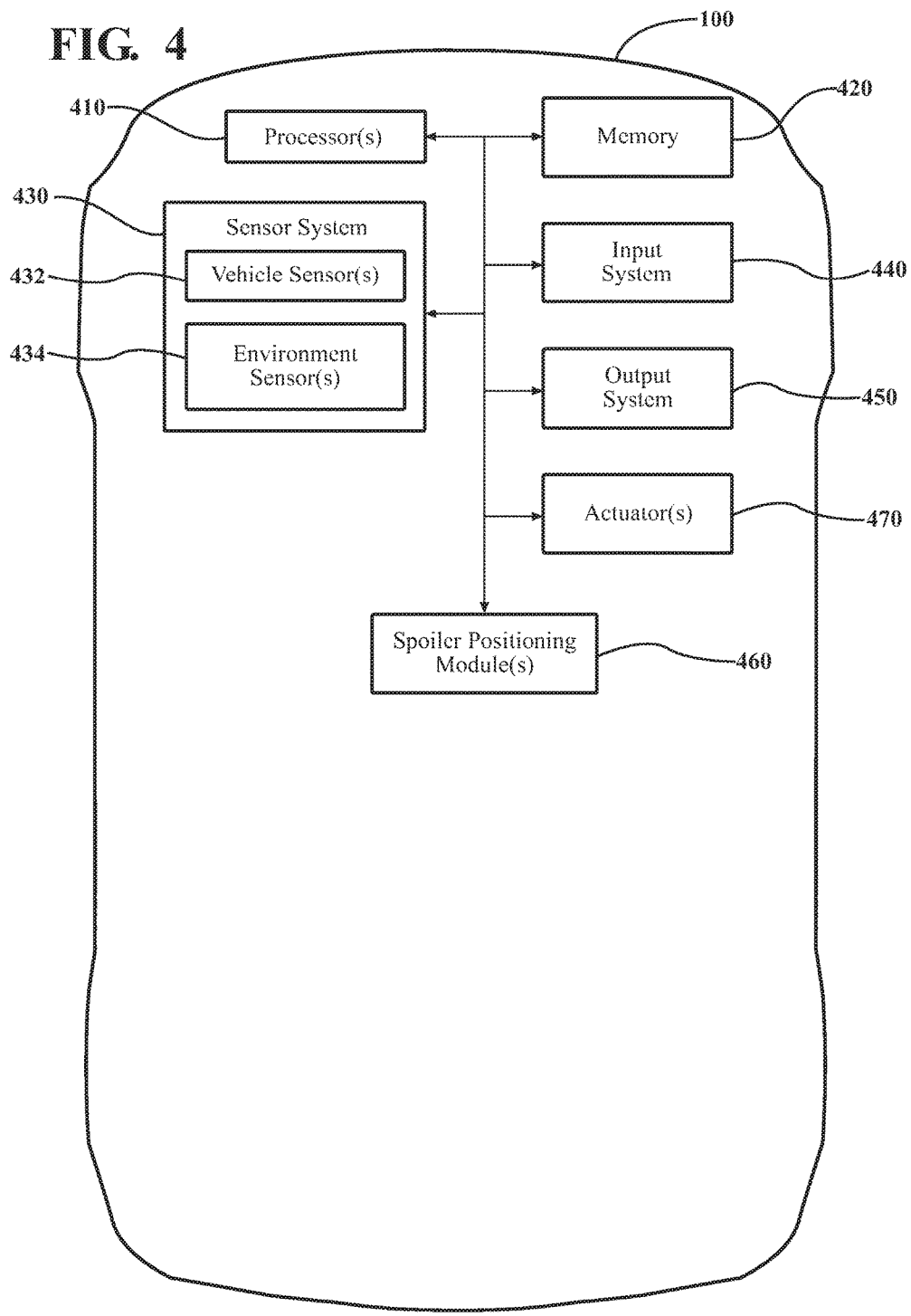
FIG. 4 shows examples of additional elements of the vehicle of FIG. 2.

FIGS. 2-4 show examples of a vehicle 100 in which a dynamic spoiler 200 can be used. As used herein, "vehicle" means any form of motorized transport. In one or more implementations, the vehicle 100 can be a pick-up truck or a sport utility vehicle. While arrangements will be described herein with respect to a pick-up truck, it will be understood that embodiments are not limited to pick-up trucks.

The vehicle 100 can have an associated longitudinal direction 30. The longitudinal direction 30 can generally extend in the forward-aft direction of the vehicle 10. The vehicle 100 can have an associated lateral direction 32, which can be substantially perpendicular to the longitudinal direction 30. As used herein, the term "substantially" includes exactly the term it modifies and slight variations therefrom. The lateral direction 32 can generally extend in the left-right direction of the vehicle 100. The vehicle 100 can have an associated elevational direction 34. The elevational direction 34 can generally extend in the top-bottom direction of the vehicle 100.

The vehicle 100 can include an open cargo area, such as a truck bed. The truck bed can be generally defined by two side walls 110, a front panel (not shown), and a tailgate 120. In one or more arrangements, the dynamic spoiler 200 can be operatively connected to the tailgate 120. The term "operatively connected," as used throughout this description, can include direct or indirect connections, including connections without direct physical contact. As explained in further detail below, the dynamic spoiler 200 can be configured to change configurations to improve aerodynamic characteristics of the vehicle 100.

Referring to FIG. 2, a partially exploded view of a tailgate portion of the vehicle 100 is shown. The dynamic spoiler 200 can include a housing 210. The housing 210 can be operatively connected to a seal 300, the tailgate 120, and an inner garnish 310. In one or more arrangements, fasteners 320 can operatively connect two or more of these components. The seal 300 and/or inner garnish 310 can prevent and/or reduce water from entering a cavity between the housing 210 and the tailgate 120.

Some of the possible elements of the dynamic spoiler 200 (also referred to as simply "the spoiler 200") are shown in FIG. 3 and will now be described. It will be understood that it is not necessary for the spoiler 200 to have all of the elements shown in the Figures or described herein. The spoiler 200 can have any combination of the various elements shown and described. Further, the spoiler 200 can have additional elements to those shown and described. In some arrangements, the spoiler 200 may not include one or more of the elements shown in the Figures.

FIG. 3 shows one example of the spoiler 200 in a partial cross-sectional view. The housing 210 can have any suitable configuration. In one or more arrangements, the housing 210 can include a lower portion 212 and an upper portion 214. The upper portion 214 can extend above a top portion of the tailgate 120. The lower portion 212 can extend away from an outer panel of the tailgate 120. In one or more arrangements, an opening 216 is defined between the lower portion 212 and the upper portion 214. Further, a cavity can be defined between the tailgate 120, the lower portion 212, and the upper portion 214. The housing 210 can be formed from any suitable material. For instance, the housing 210 can be made of one or more metals, polymers, and/or resins.

In one or more arrangements, the spoiler 200 can include a fin 220. The fin 220 can be moveable relative to the housing 210. For instance, the fin 220 can move between a retracted position and one or more extended positions. In the retracted position, the fin 220 can be positioned within the cavity defined by the lower portion 212 and the upper portion 214 of the housing 210 and the tailgate 120. The fin 220 can be moved through the opening 216 to an extended position. In an extended position, at least a portion of the fin 220 can extend rearward from the housing 210 in the longitudinal direction 30.

The fin 220 can have a distal end 222 and a proximal end 224. The terms "proximal" and "distal" are used to indicate the relative position of the ends of the fin 220 and are not meant to be limiting. In some arrangements, the proximal end 224 can be operatively connected to other elements of the spoiler 200. For instance, the proximal end 224 can be operatively connected to one or more actuators, as described below. The distal end 222 can extend rearward of the housing 210 when the fin 220 is moved to an extended position.

The fin 220 can have any suitable configuration. In one or more arrangements, the fin 220 can have a substantially rectangular conformation. In one or more arrangements, the distal end 222 of the fin 220 can be substantially identical to the proximal end 224 of the fin 220. Alternatively the distal end 222 can be different from the proximal end 224 in one or more respects. For instance, the distal end 222 can be tapered and/or curved.

The fin 220 can have a substantially rectangular cross sectional shape. The fin 220 can have any suitable thickness. The thickness of the fin 220 can be substantially uniform, or the thickness of the fin 220 can be non-uniform. The fin 220 can be sized so as to extend substantially the entire length of the housing 210 in the lateral direction 32. The fin 220 can be made of any suitable material. In one or more arrangements, the fin 220 can be made of a substantially rigid material. For instance, the fin 220 can be made of one or more metals, polymers, and/or resins, just to name a few possibilities.

As mentioned above, the fin 220 can be movable between a retracted position and one or more extended positions. FIG. 3 shows the fin 220 in a retracted position (solid lines) and in extended positions (broken lines). In one or more arrangements, when in the retracted position, the fin 220 can be retained substantially within the housing 210. For instance, the distal end 222 of the fin 220 does not extend past the opening 216. Alternatively, a portion of the fin 220 can be positioned within the cavity, while a portion can extend past the opening 116.

FIG. 3 shows fins 220a, 220b, and 220c as three examples of the fin 220 being in extended positions. Fin 220a represents a fin extended with the distal end 222 angled upward. For example, the fin 220a can have an angular position θ relative to the longitudinal direction 30. The fin 220b can represent a fin extended such that it extends substantially along the longitudinal direction 30. The fin 220c can represent a fin that is extended with the distal end 222 angled downward.

The fin 220 can be moved relative to the housing 210 in any suitable manner. In one or more arrangements, the movement of the fin 220 can include a translational component. For instance, the fin 220 can be moved translationally along a translational axis. The translational axis can extend between the distal end 222 and the proximal end 224. In some cases, the fin 220 can be moved along the longitudinal direction 30 when the fin 220 is in a substantially flat orientation. However, the translational component can be in other directions if the fin 220 is rotated relative to the longitudinal direction 30.

As mentioned above, the movement of the fin 220 can include a rotational component. For instance, the fin 220 can rotate about an axis within the housing 210. In one or more arrangements, the axis of rotation can be in a lateral direction 32.

In one or more arrangements, the fin 220 can define one or more channels 226. The channel(s) 226 can be configured to receive a pin 228. The channel(s) 226 and pin(s) 228 interaction can allow controlled movement of the fin 220 within the spoiler 200. For instance, the fin 220 can be moved such that the pin 228 remains received by the channel 226 as the fin 220 moves. The pin(s) 228 can be fixed relative to the housing 210, while the fin 220 can move relative to the pin(s) 228. In one or more arrangements, the orientation of the channel(s) 226 and/or pin(s) 228 can define the direction of movement when the fin 220 moves translationally.

In one or more arrangements, the pin(s) 228 can also cause the fin 220 to move rotationally. For instance, rotation of the pin 228 can cause rotation of the fin 220. In some arrangements, the pin 228 can be sized and shaped such that it will not rotate within the channel 226. For example, the pin 228 can be rectangular shaped, with a length that is greater than a height. The length can also be greater than a height of the channel 226, which prevents the pin 228 from rotating within the channel 226. Thus, rotation of the pin 228 can cause rotation of the fin 220.

In one or more arrangements, the spoiler 200 can include one or more actuators to cause the fin 220 to move. For instance, the actuators can include one or more linear actuators 230. The linear actuator(s) 230 can include any suitable device. For example, the linear actuator(s) 230 can include mechanical, pneumatic, hydraulic, piezoelectric, and/or mechanical and electrical hybrid actuators. The linear actuator(s) 230 can be operatively connected to the fin 220 and one or more elements of the spoiler 200. For example, the linear actuator(s) 230 can be operatively connected to the fin 220 at the proximal end 224. In some instances, the linear actuator(s) 230 can be operatively connected via one or more rotational joints to allow the fin 220 to rotate relative to the linear actuator(s) 230. The linear actuator(s) 230 can be activated responsive to receiving signals or other inputs from one or more vehicle sources.

In one or more arrangements, the actuators can include one or more rotational actuators 234. The rotational actuator(s) 234 can include any device capable of providing an input for rotational movement of the fin 220. The rotational actuator(s) 234 can include one or more motors. For example, the rotational actuator(s) 234 can include a motor operatively connected to, and configured to rotate, the pin 228. For example, the rotational actuator(s) 234 can be operatively connected to the pin 228 via one or more gears, pulleys, cables, spools, ropes, and/or belts. As described above, the rotation of the pin 228 can cause the fin 220 to rotate. The rotational actuator(s) 234 can be activated responsive to receiving signals or other inputs from one or more vehicle sources.

It is to be appreciated that the linear actuator(s) 230 and the rotational actuator(s) 234 are only a few examples providing powered movement of the fin 220. In some arrangements, a single actuator can be used to move the fin 220 translationally and/or rotationally.

In one or more arrangements, the movement of the fin 220 can be described in relation to a translational position. For instance, the fin 220 can be moved to a translational position by the linear actuator(s) 230. The translational position can be based on any suitable reference. For example, the translational position can be a distance X the fin is to be moved from the retracted position. As shown in FIG. 3, the distance X for fin 220b is shown, and can be the maximum distance the distal end 222 of the fin 220 can be moved in a translational direction.

Further, the movement of the fin 220 can be described in relation to an angular position. For example, the fin 220 can include an angular position θ. The angular position θ can be measured from any suitable reference. For example, the angular position θ can be an angle away from the longitudinal direction 30. In some arrangements, the fin 220 can be rotated through a maximum angle of rotation α as shown in FIG. 3. It is to be appreciated that the maximum angle of rotation α can be based on, at least in part, the dimensions of the housing 210. For example, the fin 220 can be rotated based on clearance within the housing 210 and the opening 216.

The vehicle 100 can include various elements that at least partially relate to the spoiler 200. Some of the possible elements of the vehicle 100 are shown in FIG. 4 and will now be described. It will be understood that it is not necessary for the vehicle 100 to have all of the elements shown in FIG. 4 or described herein. The vehicle 100 can have any combination of the various elements shown in FIG. 4. Further, the vehicle 100 can have additional elements to those shown in FIG. 4. In some arrangements, the vehicle 100 may not include one or more of the elements shown in FIG. 4. Further, while the various elements are shown as being located within the vehicle 100 in FIG. 4, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The vehicle 100 can include one or more processors 410. "Processor" means any component or group of components that are configured to execute any of the processes described herein or any form of instructions to carry out such processes or cause such processes to be performed. The processor(s) 410 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 410 can include at least one hardware circuit (e.g., an integrated circuit) configured to carry out instructions contained in program code. In arrangements in which there is a plurality of processors 410, such processors can work independently from each other or one or more processors can work in combination with each other. In one or more arrangements, the processor(s) 410 can be an electronic control unit (ECU) of the vehicle 100.

The vehicle 100 can include memory 420 for storing one or more types of data. The memory 420 can include volatile and/or non-volatile memory. Examples of suitable memory 420 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 420 can be a component of the processor(s) 410, or the memory 420 can be operatively connected to the processor(s) 410 for use thereby.

As noted above, the vehicle 100 can include the sensor system 430. The sensor system 430 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 430 includes a plurality of sensors, the sensors can work independently from each other. Alternatively, two or more of the sensors can work in combination with each other. In such case, the two or more sensors can form a sensor network. The sensor system 430 and/or the one or more sensors can be operatively connected to the processor(s) 410, the memory 420, and/or other element of the vehicle 100 (including any of the elements shown in FIG. 4).

The sensor system 430 can include any suitable type of sensor. For instance, the sensor system 430 can include one or more vehicle sensors 432, which can be configured to acquire, detect, determine, assess, monitor, measure, quantify and/or sense information about the vehicle 100 itself (e.g., position, location, orientation, speed, acceleration, deceleration, accelerator pedal position, brake pedal position, etc.). In one or more arrangements, the vehicle sensor(s) 432 can include a speedometer. In one or more arrangements, the vehicle sensor(s) 432 can include one or more cargo sensors to detect one or more conditions of cargo stored within the vehicle 100. For example, the cargo sensors can determine a loading condition, such as weight and/or size of cargo within the bed of the vehicle 100.

Alternatively or in addition, the sensor system 430 can include one or more environment sensors 434, which can be configured to acquire, detect, determine, assess, monitor, measure, quantify and/or sense data or information about the external environment in which a vehicle is located or one or more portions thereof. For example, such data or information can include wind speed, road conditions, etc. In one or more arrangements, the environment sensor(s) 434 can include an air/wind speed sensor to detect the speed of air in an environment near the vehicle 100.

The vehicle 100 can include an input system 440. An "input system" includes any device, component, system, element or arrangement or groups thereof that enable information/data to be entered into a machine. The input system 440 can be configured to receive an input from a vehicle occupant (e.g. a driver or a passenger). The vehicle 100 can include an output system 450. An "output system" includes any device, component, system, element or arrangement or groups thereof that enable information/data to be presented to a vehicle occupant (e.g. a person, a vehicle occupant, etc.). The output system 450 can be configured to present information/data to a vehicle occupant. Some components of the vehicle 100 may serve as both a component of the input system 440 and a component of the output system 450.

The vehicle 100 can include one or more modules, at least some of which will be described herein. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, the memory 420 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more spoiler positioning modules 460. The spoiler positioning module(s) 460 can be configured to perform various functions, particularly functions relating to the spoiler 200. The spoiler positioning module(s) 460 can be configured to receive and/or acquire data relating to conditions, parameters, and/or factors that may affect the aerodynamics of the vehicle 100 with respect to the spoiler 200. The spoiler positioning module(s) 460 can receive and/or acquire data from the sensor system 430, the memory 420, and/or any other source of information relating to the vehicle 100 and/or the external environment of the vehicle 100. The spoiler positioning module(s) 460 can use such information to determine a target position of the fin 220. For instance, the spoiler positioning module(s) 460 can determine a target position that includes a translational position and an angular position.

The spoiler positioning module(s) 460 can be configured to cause, directly or indirectly, the movement of the fin 220 to the target position. As used herein, "cause" or "causing" means to make, force, compel, direct, command, instruct, and/or enable an event or action to occur or at least be in a state where such event or action may occur, either in a direct or indirect manner. The spoiler positioning module(s) 460 can be configured to execute various vehicle functions and/or to transmit data to, receive data from, interact with, and/or control the vehicle 100 or one or more systems or components thereof (e.g. the actuator(s) 470).

In one or more arrangements, the spoiler positioning module(s) 460 can be configured to cause the movement of the fin 220 based at least in part on a determined target position based on a detected condition or state of the vehicle 100, a detected condition or state of the external environment of the vehicle 100, and/or other factor(s). In one or more arrangements, the causing of the movement of the fin 220 can be performed automatically by the spoiler positioning module(s) 460 and/or the processor(s) 410. In one or more arrangements, a vehicle occupant can be prompted for approval to cause the movement of the fin 220. The spoiler positioning module(s) 460 can determined a suitable position for the fin 220 based on data obtained by one or more sensors of the sensor system 430. Various examples will now be described.

In one or more arrangements, the target position of the fin 220 can be based at least partially on the air/wind speed in the external environment of the vehicle 100. Generally, the fin 220 can be moved into or remain in the retracted position when the air speed is low. The fin 220 can be moved into an extended position when the air speed is higher. In some arrangements, the distance the fin 220 moves in a longitudinal direction and/or the amount of rotation of the fin 220 can be based on the air speed. The air/wind speed can be determined in any suitable manner, now know or later developed. For instance, the air/wind speed can be determined by an air/wind speed sensor, which can be provided in any suitable location on the vehicle 100. The air/wind speed can be determined continuously, periodically, irregularly, or even randomly.

The spoiler positioning module(s) 460 and/or the processor(s) 410 can compare the current air/wind speed to one or more air/wind speed thresholds. Any suitable air/wind speed threshold(s) can be used. In one or more arrangements, the fin 220 can be positioned based on whether one or more of the air/wind speed threshold(s) are met. For example, the amount the fin 220 extends rearward in the longitudinal direction and/or the amount of rotation can be based on whether the air/wind speed meets one or more predetermined thresholds. The determination of whether the current air/wind speeds meet predetermined thresholds can be determined continuously, periodically, irregularly, or even randomly.

In one or more arrangements, the target position of the fin 220 can be based at least partially on the current speed of the vehicle 100. Generally, the fin 220 can be moved into or remain in the retracted position when the vehicle 100 is traveling at low speeds or is stationary. The fin 220 can be moved into an extended position when the vehicle 100 is traveling at higher speeds. In some arrangements, the distance the fin 220 moves in a longitudinal direction and/or the amount of rotation of the fin 220 can be based on the speed of the vehicle 100. The current speed of the vehicle 100 can be determined in any suitable manner, now know or later developed. For instance, the current speed of the vehicle 100 can be determined by a speedometer or other speed sensor. The current speed of the vehicle 100 can be determined continuously, periodically, irregularly, or even randomly.

The spoiler positioning module(s) 460 and/or the processor(s) 410 can compare the current speed to one or more vehicle speed thresholds. Any suitable vehicle speed threshold(s) can be used. In one or more arrangements, the fin 220 can be positioned based on whether one or more of the vehicle speed threshold(s) are met. For example, the amount the fin 220 extends rearward in the longitudinal direction and/or the amount of rotation can be based on whether the vehicle speed meets one or more predetermined thresholds. The determination of whether the current vehicle speeds meet predetermined thresholds can be determined continuously, periodically, irregularly, or even randomly.

In one or more arrangements, the movement of the fin 220 can be in response to a manual input received from a vehicle occupant. A vehicle occupant may wish for the fin 220 to be in a particular position. The vehicle occupant can provide a command using the input system 440 of the vehicle 100. In one or more arrangements, the movement of the fin 220 between the retracted and extended positions can be performed automatically by the vehicle 100. In such instances, the command from the vehicle occupant can act as an override. In one or more arrangements, the movement of the fin 220 between the stowed and deployed positions can be manual.

When the vehicle 100 is not in use (e.g., the engine is turned off) and/or when the vehicle 100 is in park, the fin 220 can be in the retracted position. When such conditions are detected, the fin 220 can be caused to be moved to the stowed position or can remain in the stowed position. Thus, in some instances, the fin 220 could not be visible from outside of the vehicle 100.

Now that the various potential systems, devices, elements and/or components of the vehicle 100 and spoiler 200 have been described, various methods will now be described. Various possible steps of such methods will now be described. The methods described may be applicable to the arrangements described above in relation to FIGS. 1-4, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
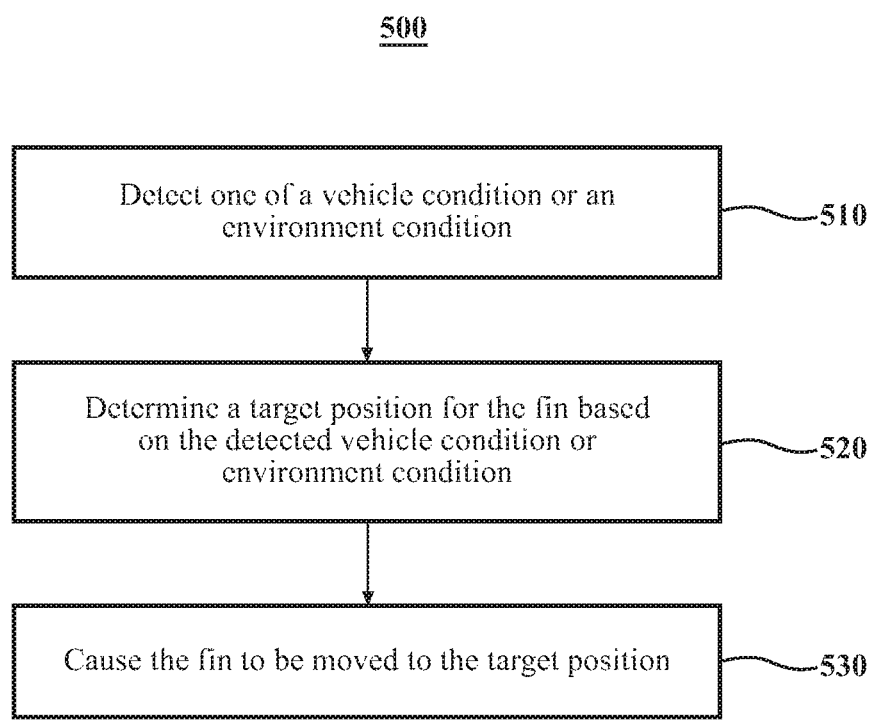
FIG. 5 is an example of a method for controlling a dynamic vehicle spoiler.

Referring now to FIG. 5, an example of a method 500 for controlling a dynamic spoiler is shown. At block 510, a vehicle condition and/or an environment condition can be detected. The detecting of the vehicle condition and/or the environment condition can be performed by one or more sensors of the sensor system 430 (e.g., one or more vehicle sensors 432 and/or one or more environment sensors 434). The detecting of the vehicle condition and/or the environment condition can be performed continuously, periodically, irregularly, or randomly. As non-limiting examples, the detected vehicle condition can be a vehicle speed and/or the detected environment condition can be an air speed in the environment of the vehicle 100. The method 500 can continue to decision block 520.

At decision block 520, a target position for a spoiler fin can be determined based on the detected vehicle condition and/or the detected environment condition. The target position can be the retracted position or one of the extended positions. The determination of the target position can be performed by the spoiler positioning module(s) 460 and/or the processor(s) 410. In one or more arrangements, the target position can include a translational position, such as translational distance X and an angular position, such as the angular position θ. The determination of the target position of the fin can be performed continuously, periodically, irregularly, or randomly. The method can continue to block 530.

At block 530, the fin 220 can be caused to be moved into the target position. In one or more arrangements, the spoiler positioning module(s) 460 and/or the processor(s) 410 can send control signals to one or more components of the vehicle 100 and/or the spoiler 200 to cause the fin 220 to move into the deployed position. For instance, such control signals can be sent to the actuator(s) 470 to cause the fin 220 to move into a target translational position and/or a target rotational position. The actuator(s) 470 can include the linear actuator(s) 230 and/or the rotational actuator(s) 234. If the fin 220 is already in the target position, then the fin 220 can remain in such position.

The method 500 can end. Alternatively, the method 500 can return to block 510 or some other block.

A non-limiting example of the operation of the vehicle 100 will now be described. In this example, the spoiler 200 can be adjusted based on an air speed in the external environment of the vehicle. The vehicle 100 can be a pickup truck and can include the spoiler 200 extending along a substantial majority of the tailgate 120.

The vehicle 100 can be traveling on a road. The air speed in the external environment of the vehicle 100 can be detected by the sensor system 430, such as by the one or more environment sensors 434. The spoiler positioning module(s) 460 and/or the processor(s) 410 can determine a target position of the fin 220 based on the detected air speed. The target position of the fin 220 can include a translational position and/or an angular position. The target position can be determined in any suitable way, and can be based on physical testing and/or computer aided simulations. For example, physical testing and/or computer aided simulation can allow target positions to be based on whether the air speed meets one or more predetermined thresholds.

In one or more arrangements, when the air speed is detected to be low, such as situations in which the vehicle 100 is traveling at low speeds or stopped, the target position of the fin 220 can be in the retracted position. In some arrangements, when the air speed is detected to be higher, the target position of the fin 220 can be an extended position. The extended position can be a position of the fin 220 in which the fin 220 extends rearward beyond the housing 210. The target position can also include an angular position θ for the fin 220 that is dependent on the air speed.

The spoiler positioning module(s) 460 and/or the processor(s) 410 can send control signals to the actuator(s) 470, such as the linear actuator(s) 230 and/or the rotational actuator(s) 234 to cause the fin 220 to be moved, if necessary, into the target position. As a result, turbulence or non-laminar airflow on the outside of the vehicle 100 can be reduced. As a result, aerodynamic performance benefits can be realized.

The air speed near the vehicle 100 can continue to be monitored by the sensor system 430. As the air speed changes, a new target position for the fin 220 can be determined by the spoiler positioning module(s) 460 and/or the processor(s) 410. Further, elements of the vehicle 100 can cause the fin to move to the new target position.

Such monitoring of the air speed can continue while the vehicle 100 is in operation. The fin 220 can be caused to be moved to the retracted position or to an extended position based on the air speed. When the vehicle 100 reaches its destination, the transmission of the vehicle 100 can be placed in park. When the transmission gear selection of park is detected, the fin 220 can be caused to be moved to the retracted position so as to be out of view.

In contrast, if the fin 220 were part of merely a fixed spoiler, the length and/or angle of the fin 220 would not be adjustable based on vehicle or environmental characteristics. For instance, for a fixed spoiler to have the same length fin as the spoiler 200 during high speeds, the fin would not be able to be retracted during low speeds or while the vehicle is in park.

It will be appreciated that arrangements described herein can provide numerous benefits, including one or more of the benefits mentioned herein. For example, arrangements described herein can improve the aerodynamic performance of a vehicle. When the fin is in a target position, turbulence or non-laminar airflow over the vehicle can be reduced. Further, the positioning of the fin can be adjusted as vehicle and/or environment conditions change. For example, the fin can be extended and/or rotated as a vehicle speed and/or an air speed increases. The fin can move to the retracted position when the vehicle is stopped or moving at slow speeds. The retracted position can provide aesthetic benefits as well as easier access to the tailgate and/or cargo.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of controlling a dynamic spoiler of a pick-up truck, the dynamic spoiler having a housing operatively connected to a tailgate of the pick-up truck, the dynamic spoiler having a fin, the fin moveable relative to the housing between a retracted position and one or more extended positions, the fin being substantially entirely located within a cavity defined at least in part by the housing when the fin is in the retracted position, a distal end of the fin extending rearward of the housing in a longitudinal direction of the pick-up truck when the fin is in the one or more extended positions, the method comprising:
   detecting one of a vehicle condition or an environment condition;
   determining a target position for the fin responsive to the detected vehicle condition or environment condition, the target position being between the retracted position and a fully extended position; and
   causing the fin to be moved into or maintained in the target position.

2. The method of claim 1, wherein the fin is moveable in a translational direction and is moveable in a rotational direction.

3. The method of claim 2, wherein the translational direction extends along a translational axis, the translational axis extending from a proximal end of the fin to the distal end of the fin, the rotational direction is about an axis of rotation, and the translational axis being substantially perpendicular to the axis of rotation.

4. The method of claim 2, wherein the target position includes a translational position and an angular position.

5. The method of claim 1, wherein the detected vehicle condition is a vehicle speed.

6. The method of claim 1, wherein the detected environment condition is air speed in an external environment of the vehicle.

7. The method of claim 1, wherein the determining a target position for the fin based on the detected vehicle condition or environment condition further comprises:
   determining whether the detected vehicle condition or environment condition meets a predetermined threshold; and
   responsive to determining that the vehicle condition or environment condition does not meet the predetermined threshold, causing the fin to be moved into or maintained in the retracted position.

8. The method of claim 7, wherein the predetermined threshold comprises one of a vehicle speed or an air speed in an external environment of the pick-up truck.

9. The method of claim 7, further comprising:
   responsive to determining that the vehicle condition or environment condition meets the predetermined threshold, causing the fin to be moved into an extended position.

10. The method of claim 1, further including:
    responsive to detecting that the pick-up truck is in park or a vehicle ignition is off, causing the fin to be moved to or remain in the retracted position.

11. A dynamic spoiler system for a pick-up truck, the system comprising:
    a housing configured for operative connection to a tailgate, the housing having a lower panel, an upper panel, a rearward-facing opening, and an internal cavity being at least partially defined by the lower and upper panels; and
    a fin moveable between a retracted position and a selected extended position,
    when in the retracted position, the fin being substantially entirely located within the cavity defined by housing, and
    when in the selected extended position, the fin extending at least partially out of the housing through the opening in a rearward direction, the selected extended position being selected between the retracted position and a fully extended position, the selected extended position being selected based at least partially on a detected condition.

12. The system of claim 11, wherein the fin is moveable in a translational direction relative to the housing and is moveable in a rotational direction relative to the housing.

13. The system of claim 12, further comprising:
    one or more actuators configured to move the fin in the translational direction and the rotational direction.

14. The system of claim 13, wherein the one or more actuators comprises a linear actuator and a rotational actuator.

15. The system of claim 13, further comprising a processor communicatively linked to the one or more actuators, the processor being configured to cause the one or more actuators to move the fin based at least partially on the detected condition.

16. The system of claim 15, wherein the detected condition is a current vehicle speed.

17. The system of claim 15, wherein the detected condition is an air speed in an external environment of the vehicle.

18. A dynamic spoiler system for a vehicle, the system comprising:
    a housing configured for operative connection to a vehicle structure, the housing having a lower panel, an upper panel, a rearward-facing opening, and an internal cavity being at least partially defined by the lower and upper panels; and
    a fin moveable between a retracted position and an extended position,
    when in the retracted position, the fin being substantially entirely located within the cavity defined by housing, and
    when in the extended position, the fin extending at least partially out of the housing through the opening in a rearward direction, further comprising a pin positioned within the cavity, the fin defining a channel, and wherein the fin is moveable such that the pin remains received within the channel as the fin moves in both a translational and a rotational direction.

19. The system of claim 18, wherein the pin is rotatable to cause rotation of the fin.

* * * * *